US009509682B2

(12) United States Patent
Jo et al.

(10) Patent No.: US 9,509,682 B2
(45) Date of Patent: Nov. 29, 2016

(54) OBSCURING USERNAMES DURING A LOGIN PROCESS

(71) Applicant: The Board of Regents of the Nevada System of Higher Education on Behalf of the University of Nevada, Las Vegas, Las Vegas, NV (US)

(72) Inventors: Juyeon Jo, Henderson, NV (US); Yoohwan Kim, Henderson, NV (US)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 0 days.

(21) Appl. No.: 14/591,208

(22) Filed: Jan. 7, 2015

(65) Prior Publication Data

US 2015/0199505 A1    Jul. 16, 2015

Related U.S. Application Data

(60) Provisional application No. 61/925,858, filed on Jan. 10, 2014.

(51) Int. Cl.
*H04L 29/06* (2006.01)
*G06F 21/31* (2013.01)
(Continued)

(52) U.S. Cl.
CPC .............. *H04L 63/083* (2013.01); *G06F 21/31* (2013.01); *G06F 21/33* (2013.01); *G06F 21/44* (2013.01); *G06F 21/60* (2013.01); *G06F 21/6254* (2013.01); *H04L 63/08* (2013.01)

(58) Field of Classification Search
CPC ........ G06F 21/31; G06F 21/33; G06F 21/44; G06F 21/45; G06F 21/36; G06F 21/6254; G06F 21/60; H04L 63/08; H04L 63/083
See application file for complete search history.

(56) References Cited

U.S. PATENT DOCUMENTS 4,582,986 A    4/1986 Stockburger et al.
6,212,638 B1   4/2001 Lee et al.
(Continued)

OTHER PUBLICATIONS

Jo, Juyeon, Yoohwan Kim, and Sungchul Lee. "Mindmetrics: Identifying users without their login IDs." 2014 IEEE International Conference on Systems, Man, and Cybernetics (SMC). IEEE, 2014. (pp. 2121-2126).*

(Continued)

*Primary Examiner* — Kari Schmidt
(74) *Attorney, Agent, or Firm* — Michael Best & Friedrich LLP (57) ABSTRACT

In general, the subject matter described in this document can be embodied in methods, systems, and program products. A computing system receives a token that was specified during a process for logging into an account. The computing system determines whether the token matches any of a plurality of tokens that are assigned to a respective plurality of accounts. The computing system identifies, in response to determining that the token matches a particular token that is assigned to a particular one of the plurality of accounts, a username for the particular one of the plurality of accounts. The computing system provides information to cause a computer display to present the username and multiple other usernames in an obscured manner. The computing system receives an indication that user input selected the username. The computing system receives a password. The computing system provides authorization to log into the account.

14 Claims, 10 Drawing Sheets

(51) Int. Cl.
*G06F 21/44* (2013.01)
*G06F 21/60* (2013.01)
*G06F 21/62* (2013.01)
*G06F 21/33* (2013.01)

(56) References Cited

U.S. PATENT DOCUMENTS

| | | | |
|---|---|---|---|
| 6,845,453 B2 | 1/2005 | Scheidt et al. | |
| 6,862,610 B2 * | 3/2005 | Shuster | H04L 63/126 707/999.005 |
| 6,976,164 B1 | 12/2005 | King et al. | |
| 7,123,752 B2 | 10/2006 | Kato et al. | |
| 7,131,009 B2 | 10/2006 | Scheidt et al. | |
| 7,246,243 B2 | 7/2007 | Uchida | |
| 7,298,872 B2 | 11/2007 | Glisson | |
| 7,676,681 B2 | 3/2010 | Dillon et al. | |
| 7,788,712 B2 | 8/2010 | Hong et al. | |
| 8,131,745 B1 * | 3/2012 | Hoffman | G06Q 10/107 707/766 |
| 8,132,012 B2 | 3/2012 | Labaton | |
| 8,172,137 B1 | 5/2012 | Chan | |
| 8,188,840 B2 | 5/2012 | Tseng et al. | |
| 8,266,432 B2 | 9/2012 | Asghari-Kamrani et al. | |
| 8,533,472 B2 | 9/2013 | Takasugi et al. | |
| 8,751,575 B2 * | 6/2014 | Tejada-Gamero | G06Q 10/06 380/247 |
| 9,369,468 B2 * | 6/2016 | White | G06F 21/56 |
| 2003/0101116 A1 * | 5/2003 | Rosko | G06F 21/41 705/35 |
| 2003/0154286 A1 * | 8/2003 | Tang | H04L 63/0414 709/227 |
| 2006/0010215 A1 * | 1/2006 | Clegg | G06Q 10/107 709/206 |
| 2006/0036547 A1 * | 2/2006 | Yasuhara | G06Q 20/40 705/44 |
| 2009/0019289 A1 * | 1/2009 | Dasgupta | H04L 63/0428 713/183 |
| 2009/0125521 A1 * | 5/2009 | Petty | G06F 21/6263 |
| 2009/0235199 A1 * | 9/2009 | Mastie | G06F 21/84 715/781 |
| 2011/0126289 A1 * | 5/2011 | Yue | G06F 21/554 726/26 |
| 2013/0333009 A1 * | 12/2013 | Mackler | G06F 21/31 726/7 |
| 2015/0143510 A1 * | 5/2015 | Hanthorn | G06F 21/62 726/19 |

OTHER PUBLICATIONS

Juels, Ari, and Ronald L. Rivest. "Honeywords: Making password-cracking detectable." Proceedings of the 2013 ACM SIGSAC conference on Computer & communications security. ACM, 2013. (pp. 145-160).*

* cited by examiner

OBSCURING USERNAMES DURING A LOGIN PROCESS

CROSS-REFERENCE TO RELATED APPLICATIONS

This application claims the benefit of U.S. Provisional Application Ser. No. 61/925,858, filed Jan. 10, 2014. The disclosure of the prior application is considered part of (and is incorporated by reference in) the disclosure of this application.

TECHNICAL FIELD

This document generally relates to obscuring usernames during a login process.

BACKGROUND

Current authentication systems are threatened by attacks that attempt to determine user passwords, while the corresponding usernames may already be known because usernames are not always considered private information. Moreover, the Advanced Persistent Threat (APT) is currently an issue, and plain-text passwords may be stolen by malware and keylogging software. Some methods to fortify the authentication process include biometrics and one-time passwords, but these techniques may be inaccurate and require specialized devices.

SUMMARY

This document describes techniques, methods, systems, and other mechanisms for obscuring usernames during a login process.

As additional description to the embodiments described below, the present disclosure describes the following embodiments.

Embodiment 1 is a computer-implemented method. The method includes receiving, by a computing system, a token that was specified by first user input during a process for logging into a user account. The method includes determining, by the computing system, whether the token that was specified by the first user input matches any of a plurality of tokens that are assigned to a respective plurality of user accounts. The method includes identifying, by the computing system and in response to determining that the token that was specified by the first user input matches a particular token that is assigned to a particular one of the plurality of user accounts, a username for the particular one of the plurality of user accounts. The method includes providing, by the computing system, information to cause a computer display to present, for user selection the username with a part of the username obscured, and multiple other usernames with a part of each of the multiple other usernames obscured. The method includes receiving, by the computing system, an indication that second user input selected, during the process for logging into the user account, the username with the part of the username obscured. The method includes receiving, by the computing system, a particular password that was specified by third user input during the process for logging into the user account; the method includes providing, by the computing system, authorization to log into the user account in response to the computing system having received the indication that the second user input selected the username with the part of the username obscured in distinction to any of the multiple other usernames with the part of each of the multiple other usernames obscured, and determined that the particular password that was specified by the third user input matches a password that is assigned to the particular one of the plurality of user accounts.

Embodiment 2 is the method of embodiment 1, wherein the token, the username, and the password were specified by user input during a process for specifying credentials for the user account.

Embodiment 3 is the method of embodiment 1, wherein the method further comprises receiving, by the computing system and during a process for specifying credentials for the user account that precedes performance of the process for logging into the user account, user input that specifies the token, user input that specifies the username, and user input that specifies the password.

Embodiment 4 is the method of embodiment 1, wherein presenting the username with the part of the username obscured includes presenting the username with some of the characters in the username replaced with a masking character.

Embodiment 5 is the method of embodiment 1, wherein presenting the username with the part of the username obscured includes presenting the username with some of the characters in the username removed.

Embodiment 6 is the method of embodiment 1, wherein the token, username, and password were each user input during the process for logging into the user account by user typing.

Embodiment 7 is the method of embodiment 1, wherein the computing system is configured so that, upon determining that a selected username or a specified password does not match credential information stored for the particular one of the plurality of user accounts, the computing system does not indicate which of the selected username and the specified password failed to match the credential information stored for the particular one of the plurality of user accounts.

Embodiment 8 is directed to recordable media having instructions stored thereon, the instructions, when executed by one or more processors, perform actions according the method of any one of embodiments 1 to 7.

Embodiment 9 is directed to a system including a recordable media having instructions stored thereon, the instructions, when executed by one or more processors, perform actions according the method of any one of embodiments 1 to 7.

Particular implementations can, in certain instances, realize one or more of the following advantages. Requiring users to enter tokens in addition to usernames raises an additional barrier to attackers that are trying to break into user accounts. Moreover, partially obscuring usernames prevents an attacker from gaining access to the entire username, which may be required to access the account. Such a system may stop or slow down attackers, such that account holders can change their account credentials before attackers are able to gain access. Furthermore, users are able to determine whether they are interacting with a legitimate authentication system, because illegitimate systems may not display a correct username.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes technologies for obscuring usernames during a login process. With such technologies, a user specifies a token with which a computing system can identify a user account. The computing system then provides multiple usernames for display to the user, with one of the usernames being the correct username for the user account and the other usernames being either usernames for other user accounts or being fake usernames. To prevent attacking systems from recording the usernames, the correct username and the other usernames may be partially obscured (e.g., by masking some of the characters in the usernames). A user is able to select one of the usernames that is displayed in a partially-obscured manner and enter a password for the selected username. If the password and username match the credentials stored for the user account, the user is authenticated to access information associated with the user account (e.g., a banking account, an online email system, or a social networking system). This login process and the creation of the credential information is described with additional detail in reference to the figures.

Figure 1:
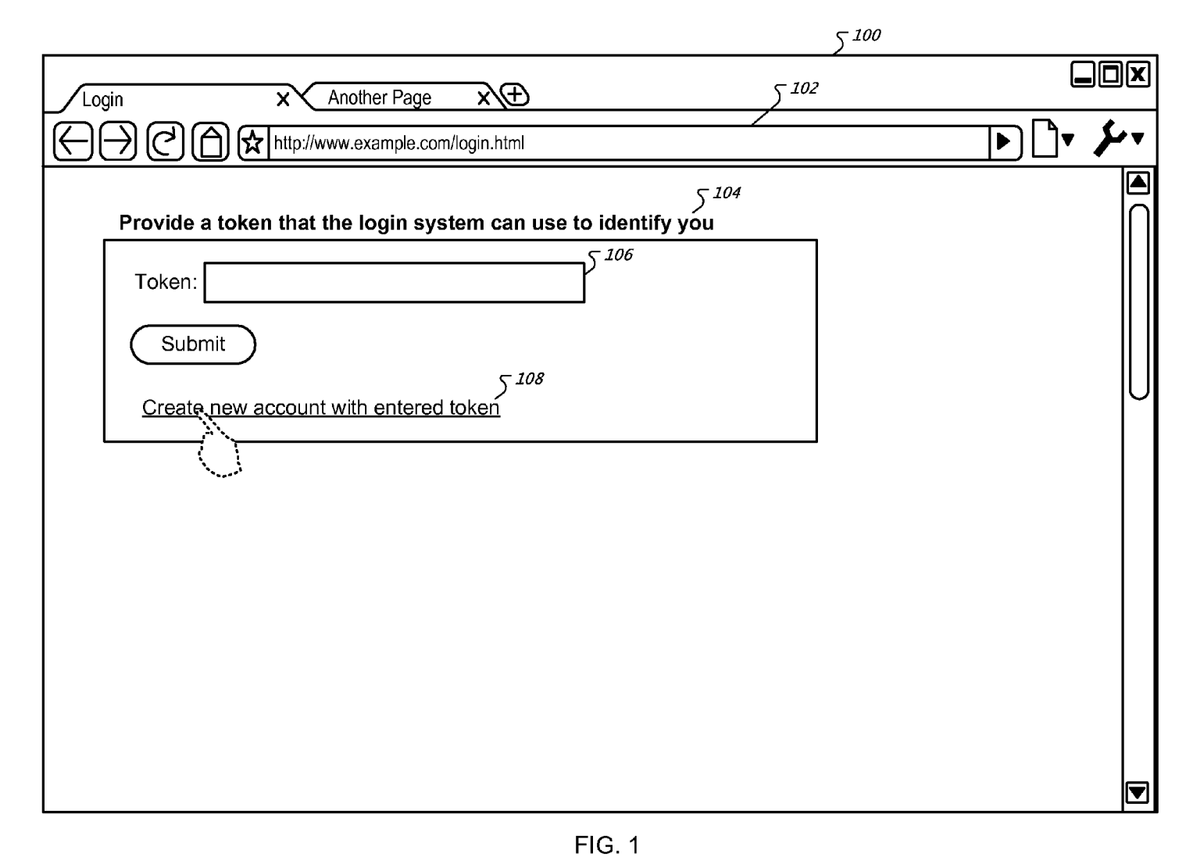
FIG. 1 shows a webpage for supplying a token.

FIG. 1 shows a webpage 100 for supplying a token. In this example, a user may have used a computing device to navigate to a display of the webpage 100 by typing a URL into the navigation bar 102, selecting a link to the webpage 100, or selecting a bookmark to the webpage 100. As a result, the computing device may request resources that correspond to the URL from a remote server system, and the remote server system may provide the resources for receipt by the computing device. A web browser application program at the computing device (e.g., a smartphone, tablet computer, laptop computer, or desktop computer) may render the received resources in order to present the webpage 100 on a display of the computing device.

The webpage 100 includes a prompt 104 that requests that the user type a token into text box 106. In this illustration, the user has yet to create a user account and thus enters a token into text box 106 and selects link 108. The user may enter a token into text box 106 by typing characters of the token with a physical or virtual keyboard. In some examples, the user enters the token or other information into the computing device by submitting a voice query which the computing device or another computing system converts to text. In some implementations, the text that is typed into text box 106 is masked so that a nearby individual is not able to discern the token. The user may select the link by pressing a finger to a location at which the link is displayed on a touchscreen (in those embodiments in which the computing device includes a touchscreen), or by moving a mouse or touchpad cursor to a location at which the link is displayed and selecting a button or the touchpad.

In some implementations, in response to selecting link 108, the computing device sends the user-specified token to a remote computing system. The remote computing system may have access to a database in which information for a plurality of user accounts is stored. For instance, each of the plurality of user accounts may be assigned a token, a username, and a password that were specified by users of the respective accounts. Upon receiving the user-specified token, the remote computing system may compare the user-specified token to the tokens stored for each of the user accounts in order to determine whether the token is already assigned to a user account. If the token has been taken, the computing system may send information that prompts a user of the computing device to enter another token. If the username has not been taken, the computing system may send resources for causing the computing device to display the webpage that is shown in FIG. 2.

In some implementations, a user can specify a token that is already assigned to one or more other user accounts. In other words, the token need not be unique among the user accounts. In any event, upon the user entering a token, the user is provided the user interface that is shown by the webpage of FIG. 2.

Figure 2:
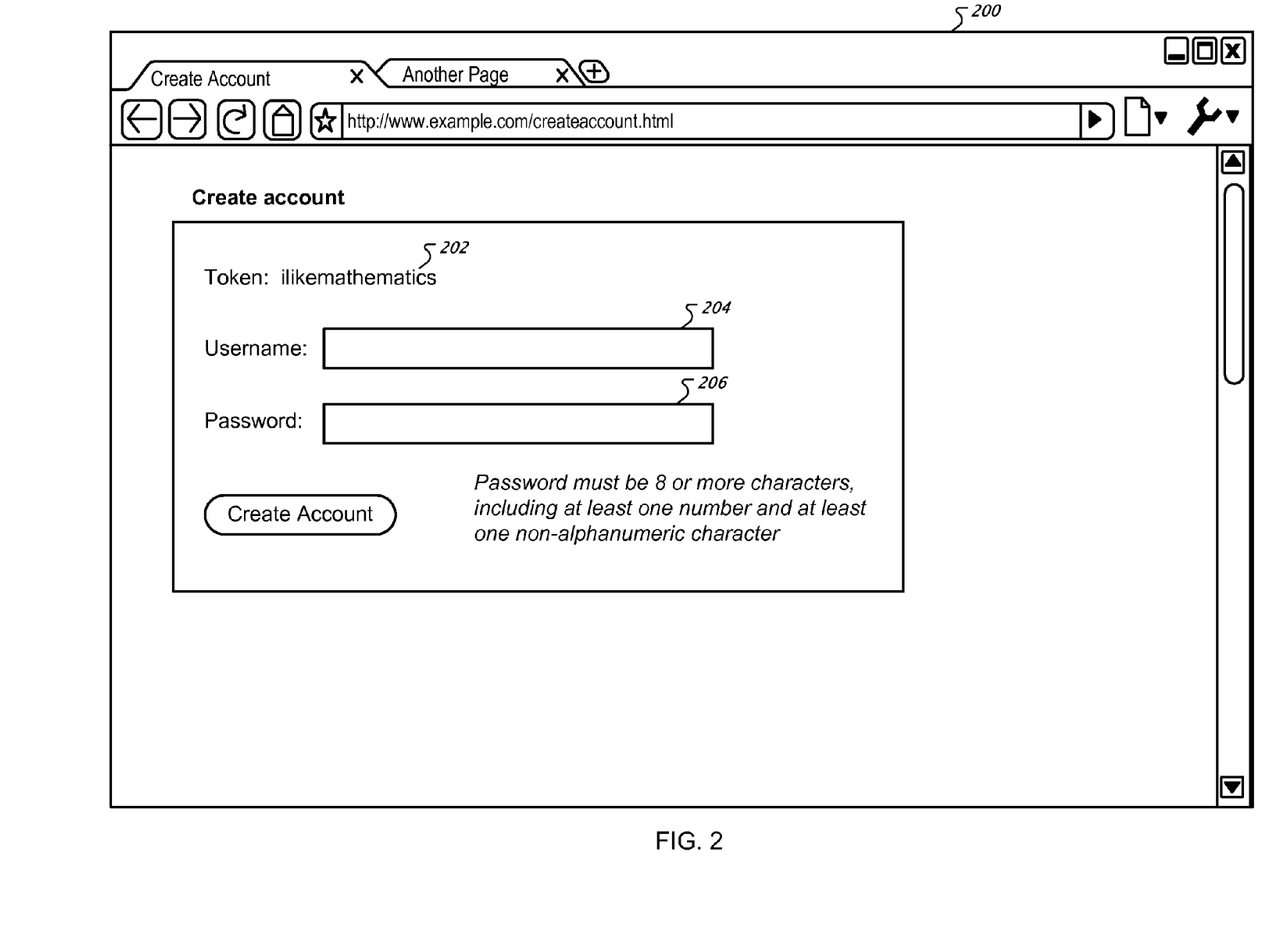
FIG. 2 shows a webpage for specifying a username and password during an account creation process.

FIG. 2 shows a webpage 200 for specifying a username and password during an account creation process. In this illustration, a user typed the word "ilikemathematics" into text box 106 (see FIG. 1) before selecting link 108 in order to create a new account with the entered token. As such, webpage 200 displays "ilikemathematics" as the user-specified token 202. The webpage 200 includes a text box 204 with which the user is able to specify a username for the new account, and another text box 206 with which the user is able to specify a password for the account.

Figure 3:
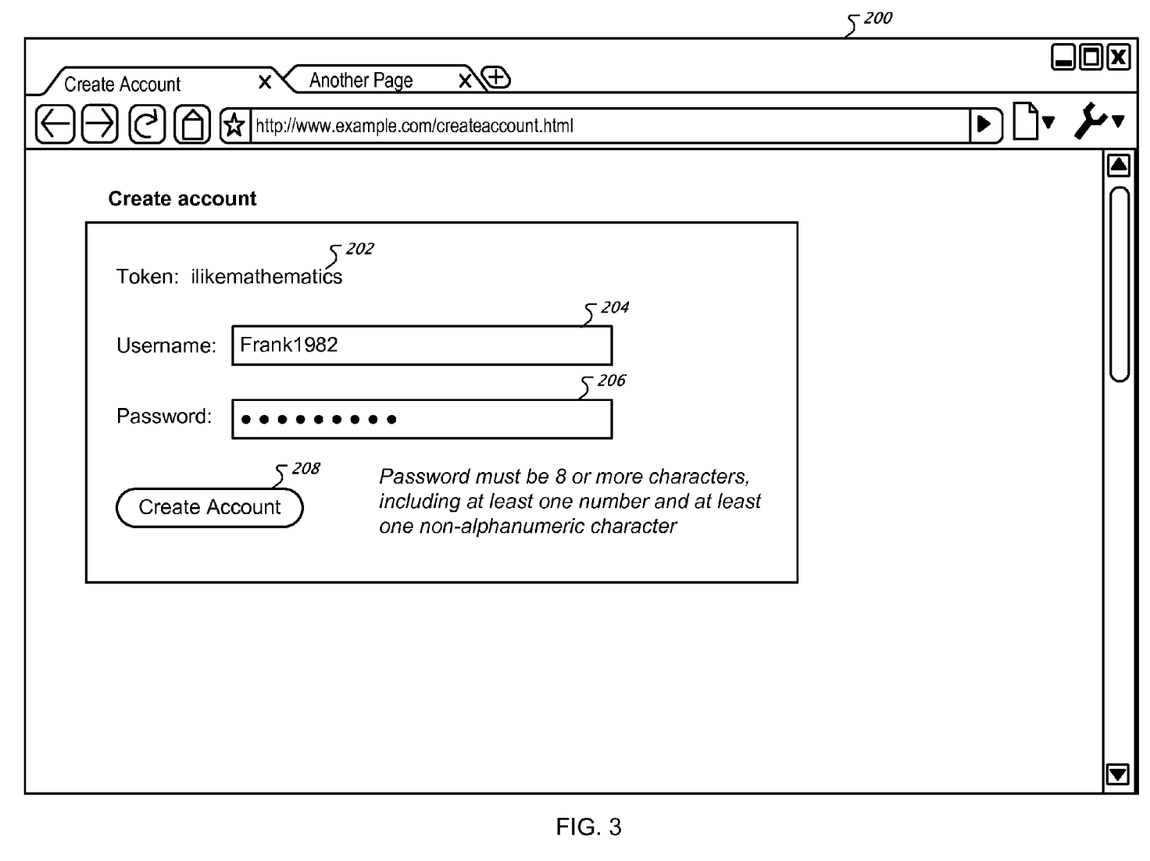
FIG. 3 shows the webpage for specifying the username and password, with all credential information specified by the user.

FIG. 3 shows the webpage 200 for specifying the username and password, with all credential information specified by the user. In this example, the user has typed the username "Frank1982" into text box 204 and has typed the password "fourbooks" into text box 206. The computing device may mask all characters of the password, as shown in FIG. 3, so that any other individual that is viewing the webpage 200 is not able to see the user's password. After the user has entered all of this credential information (e.g., the token, the username, and the password), the user selects the "Create Account" user interface element 208. In some implementations, upon typing the credentials or upon selecting the "Create Account" user interface element 208, the computing device validates the entered information, for example, to ensure that the username is unique among all usernames and that the password satisfies the password requirements (e.g., a length of the password). If the computing device determines that there is an error with the username or password, the computing device may prompt the user to enter another username or password.

Figure 4:
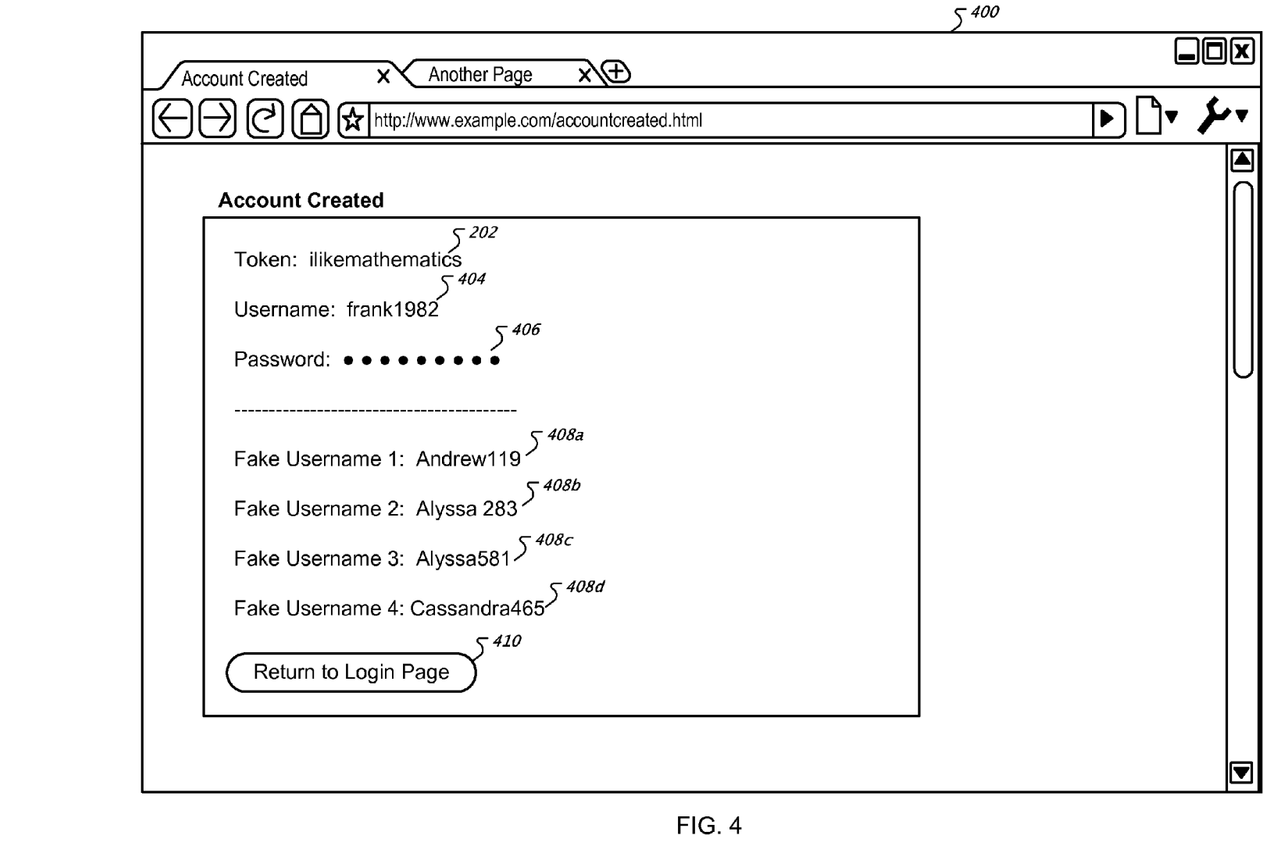
FIG. 4 shows a webpage that confirms that a user account was created.
Figure 5:
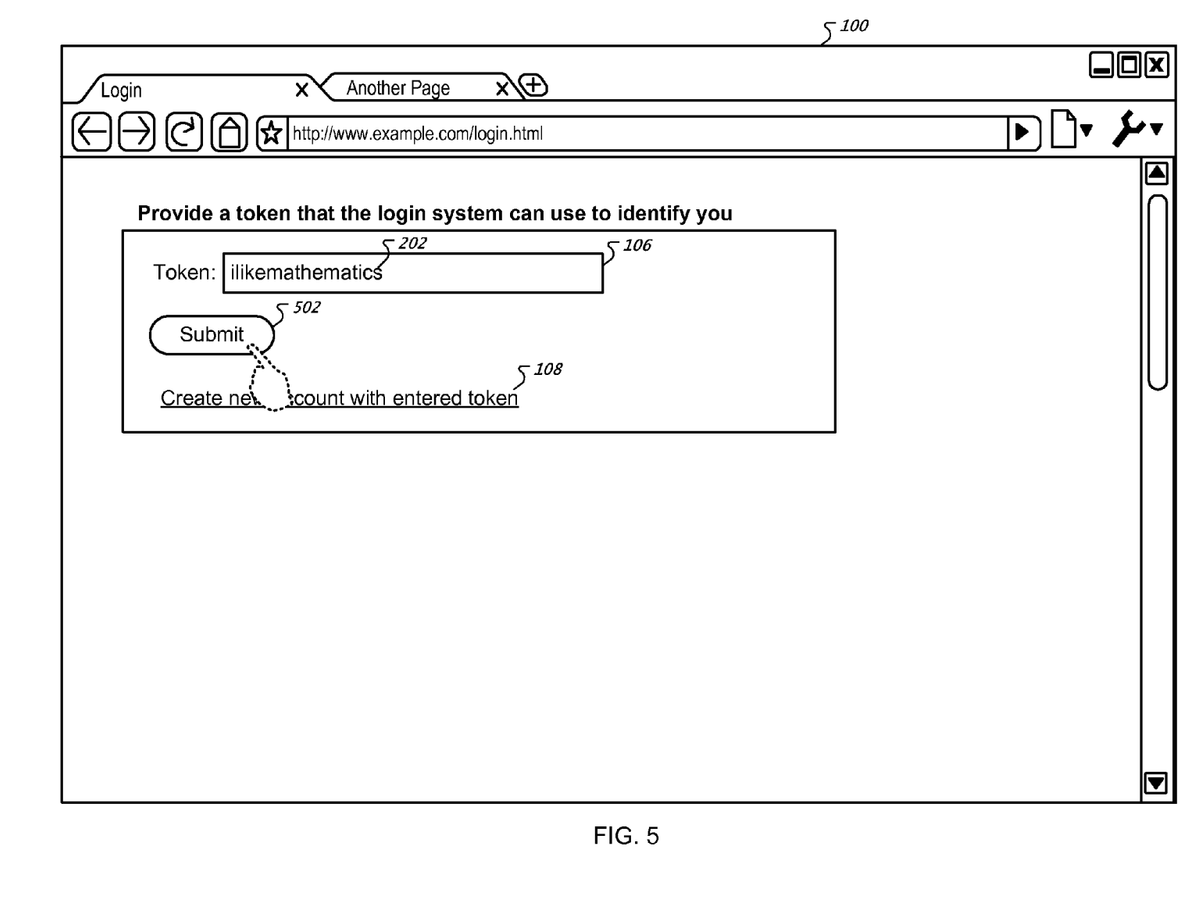
FIG. 5 shows a webpage for supplying a token.

FIG. 4 shows a webpage 400 that confirms that a user account was created. The webpage 400 displays the token 202, the username 404, and the password 406 (which may be displayed masked or unmasked). In some implementations, the webpage 400 displays fake usernames 408a-d, so that the user is able to see the other usernames that may be provided as alternatives when the user logs in (as discussed below). In some implementations, the webpage 400 does not display the fake usernames 408a-d. The user may select the "Return to Login Page" user interface element 410 in order to return to the login page that is shown in FIG. 5. In some implementations, the user is able to specify the fake usernames 408a-d.

FIG. 5 shows a webpage 100 for supplying a token. The webpage 100 is the same as that shown in FIG. 1, except that in FIG. 5 the user is entering the token 202 into text box 106 in order to login to a user account, rather than to create a new account. As such, after typing token 202 into text box 106, the user selects the "Submit" user interface element 502. As a result of selecting the "Submit" user interface element 502, the computing system navigates to the webpage 600 that is shown in FIG. 6.

Figure 6:
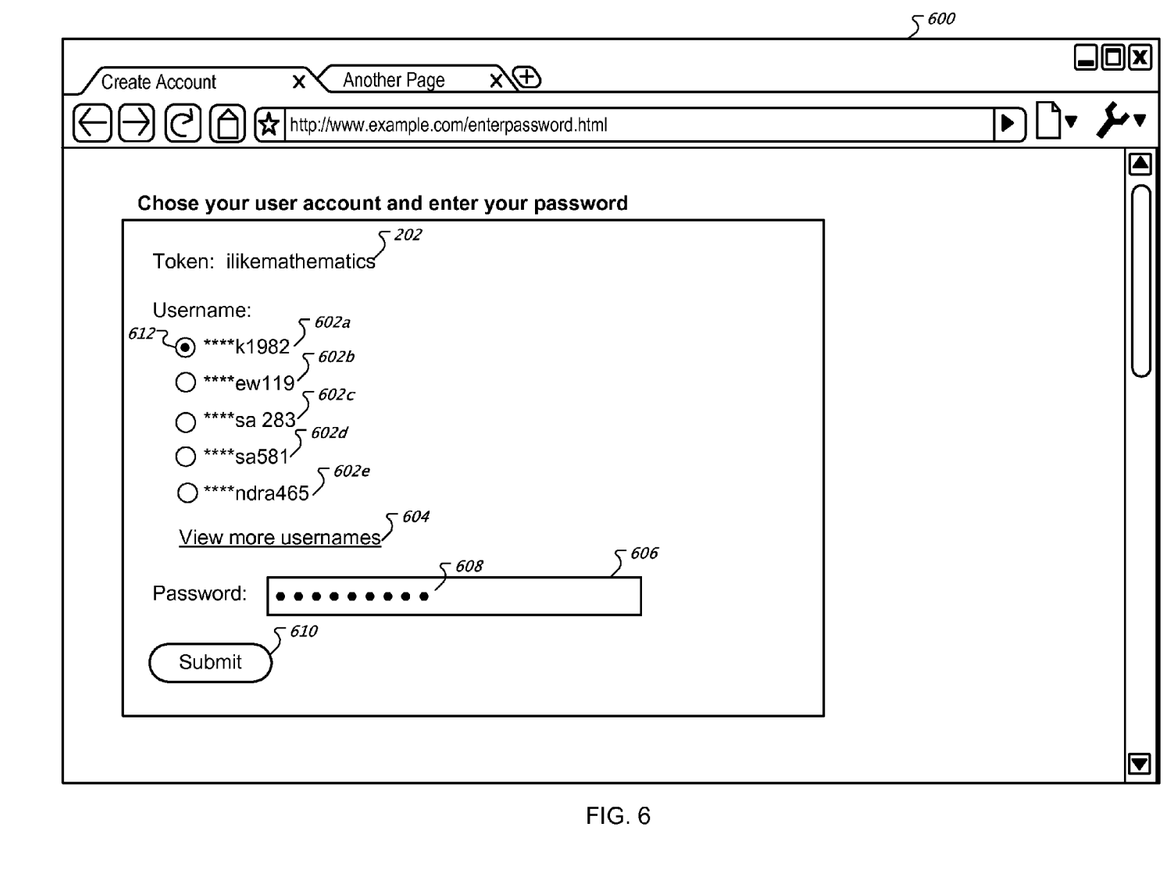
FIG. 6 shows a webpage for supplying a username and password during a credential authentication process.

FIG. 6 shows a webpage 600 for supplying a username and password during a credential authentication process. Webpage 600 shows the token 202 that the user specified in web page 100. Webpage 600 also shows multiple partially-obscured usernames 602a-e, and is configured to enable a user to select one of the partially obscured usernames 602a-e. Here the usernames are partially-obscured by replacing some username characters with asterisks, though other mechanisms for partially obscuring the usernames may be performed, for example, by simply removing characters from the username.

In this example, the user knows that his username is "frank1982," and therefore selects a radio button 612 to indicate that the text "****k1982" matches the username. In some implementations, the displayed list of partially-obscured usernames 602a-e is the same and appears in the same order every time a particular computer or any computer supplies the same particular token (i.e., "ilikemathematics" in this illustration). A reason to display the same list of partially-obscured usernames every time may be so that an attacker does not simply supply the same token with a different computing system (using a different IP address) in order to identify which partially-obscured username does not change. In some implementations, the order of the partially-obscured usernames is fixed at time of account creation and at time of each attempted login so that a user is able to learn through user experience which partially-obscured username matches the username that was supplied by the user. In this way, the user is able to quickly log on to the account without much additional effort spent trying to figure out which partially-obscured username is correct. In some implementations, webpage 600 does not include a partially-obscured username that matches the username of the user, and thus the user may select the "View more usernames" link 604 in order to cause the computing device to display additional partially-obscured usernames for selection by the user. Accordingly, the system may be configured to not always place an obscured version of the username in the first set of usernames that is displayed to the user. Webpage 600 may display more than five partially-obscured usernames, for example, ten, twenty, or more partially-obscured usernames.

After selecting radio button 612, the user types the password 608 that matches the username "frank1982" into the text box 606 and selects the "Submit" user interface element 610. If the user specified a token, username, and password that matches the information assigned to a particular user account, the web browser may navigate to a web page that shows personalized information that is associated with the particular user account (e.g., a personalized feed in a social network or the details of a bank account).

Figure 7:
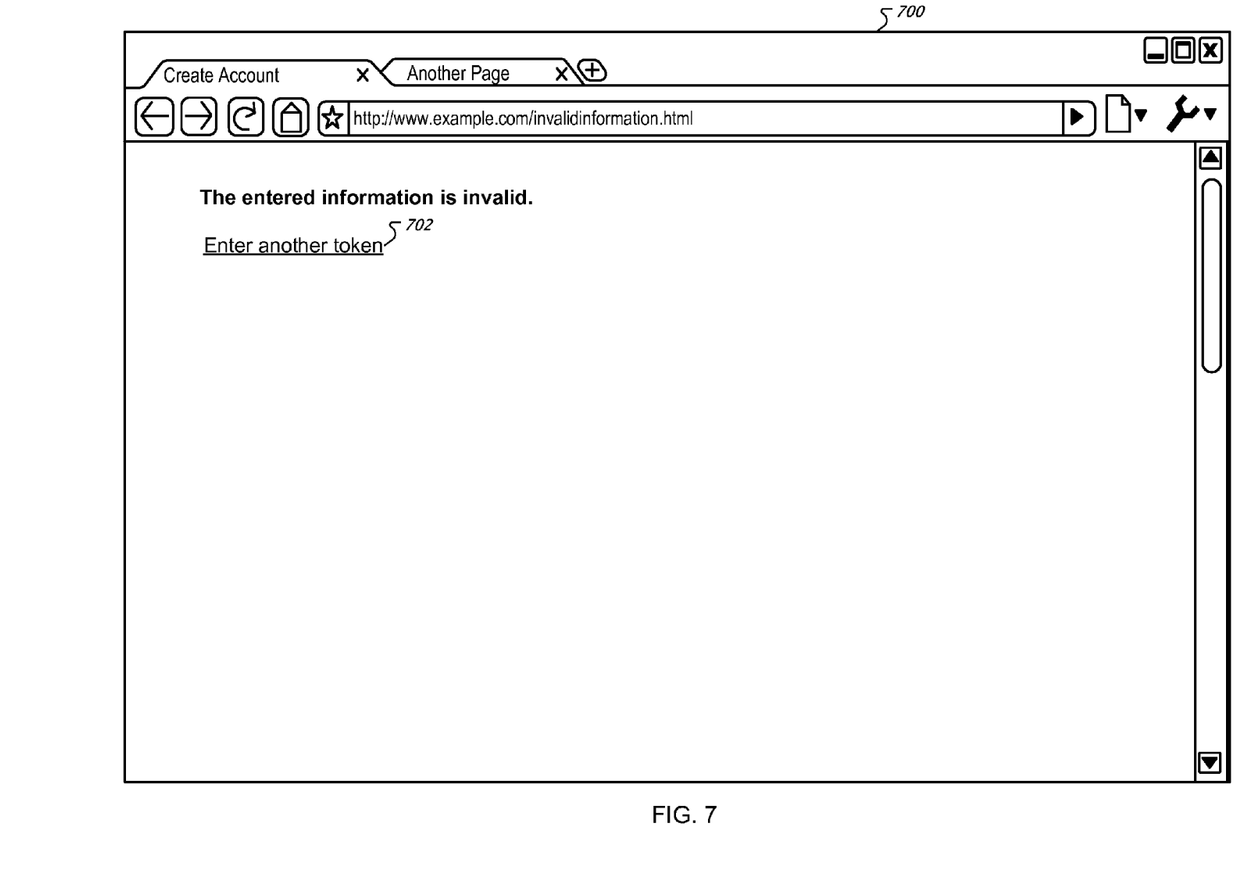
FIG. 7 shows a webpage for indicating that the user entered incorrect credentials.

Should the user have entered credential information that did not all match the information assigned to the particular user account (e.g., the password, token, or username was incorrect), the computing device may display the web page 700.

FIG. 7 shows a webpage 700 for indicating that the user entered incorrect credentials. In this example, webpage 700 states that "The entered information is invalid" and displays a link 702 that the user can select in order to return to webpage 100.

Figure 8:
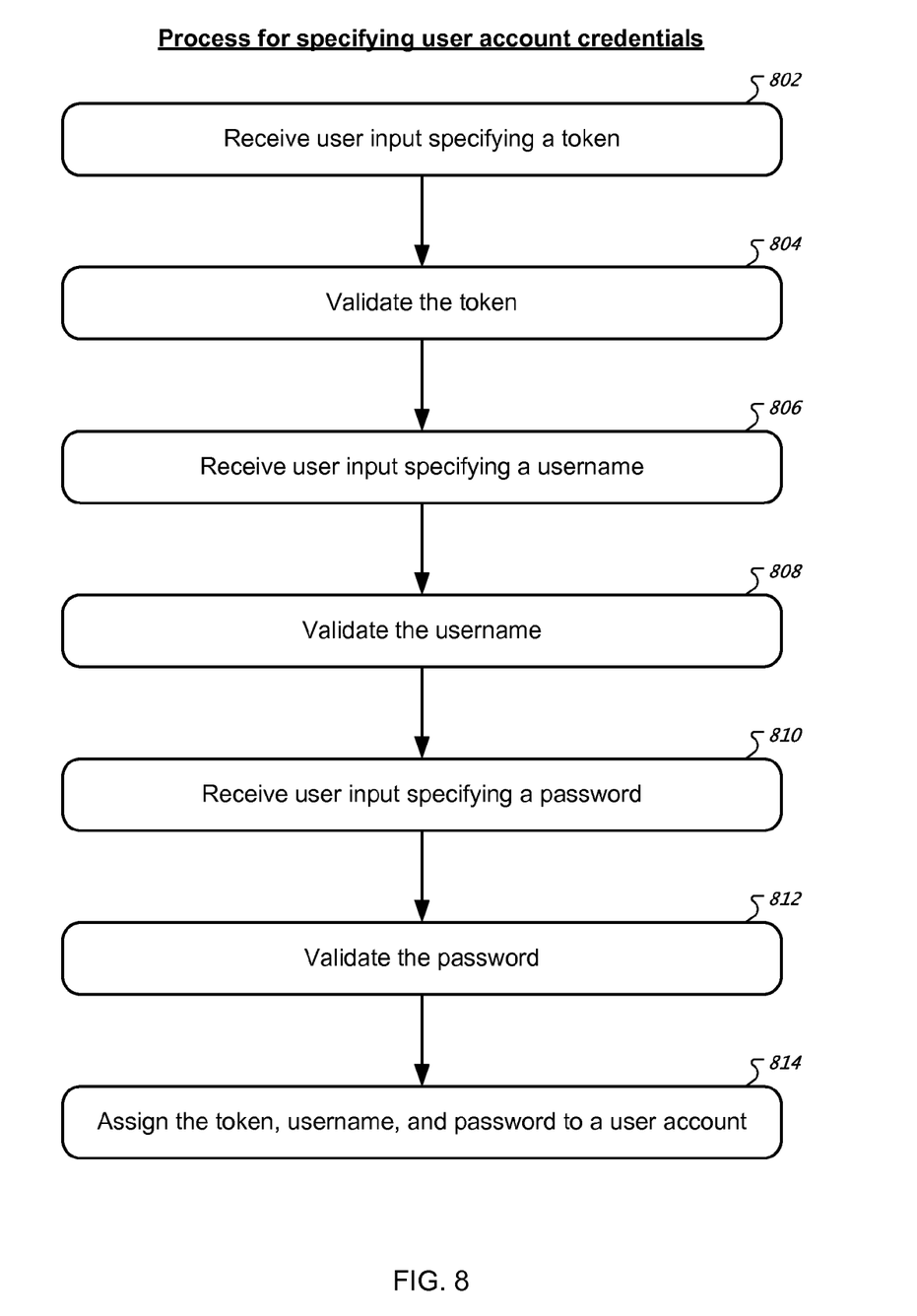
FIG. 8 shows a flowchart of a process for specifying user account credentials.

FIG. 8 shows a flowchart of a process for specifying user account credentials.

At box 802, a computing system receives user input specifying a token. For example, the computing device that is presenting screen 100 may receive an indication that a user typed the token "ilikemathematics" into text box 106 and then selected the link 108. The computing device may transmit this information for receipt by a remote server system. In this instance, either the computing device or the remote server system, or a combination of the computing device and the remote server system, serve as the computing system that receives the user input.

At box 804, the computing system validates the token. For example, the computing system may determine whether the token satisfies certain criteria, such as having no spaces. In some examples, the computing system may determine whether the token is unique (e.g., whether the token has not already been associated with another account). If the token is not unique, the computing system may prompt the user to submit a new token. In some examples, multiple users are permitted to assign the same token to different user accounts, and as a result, screen 600 may display partially-obscured usernames for multiple valid usernames among usernames 602a-e.

At box 806, the computing system receives user input specifying a user name. For example, the computing device that is displaying screen 200 may receive an indication that the user typed "frank1982" into text box 204. The computing device may provide this information for receipt by the remote server system.

At box 808, the computing system validates the username. For example, the computing system may determine whether the username satisfies certain criteria, such as having no spaces. In some examples, the computing system may determine whether the username is unique (e.g., whether the username has not already been associated with another account). If the username is not unique, the computing system may prompt the user to submit a new token. In some examples, multiple users are able to enter a same username, so long as the tokens for the same usernames are not the same (in which case the computing system may prompt the user to enter a new username).

At box 810, the computing system receives user input specifying a password. For example, the computing device that is displaying the screen 200 may receive an indication that user input typed a password into text box 206. The computing device may transmit this password (e.g., in plain text or encrypted format) to the remote server system.

At box 812, the computing system validates the password. For example, the computing device or the remote computing system may determine whether the password that was entered into text box 206 satisfies predetermined criteria (e.g., the password must be a certain number of characters long, and must have a certain number of uppercase letters, numbers, and special characters).

At box 814, the computing system assigns the token, the username, and the password to a user account. In some examples, the computing system is configured to assign only a single token to the user account at any given time. In some examples, the computing system is configured to assign only a single username to the account at any given time. In some examples, the computing system is configured to assign only a single password to the account at any given time. The computing system may be configured to not publish one or more of the token, full username, and password without a user having supplied the proper credentials to access the user account.

In some implementations, the computing system may be configured to enable a user to enter the token, username, and password on a single page, or on three different pages.

Figure 9:
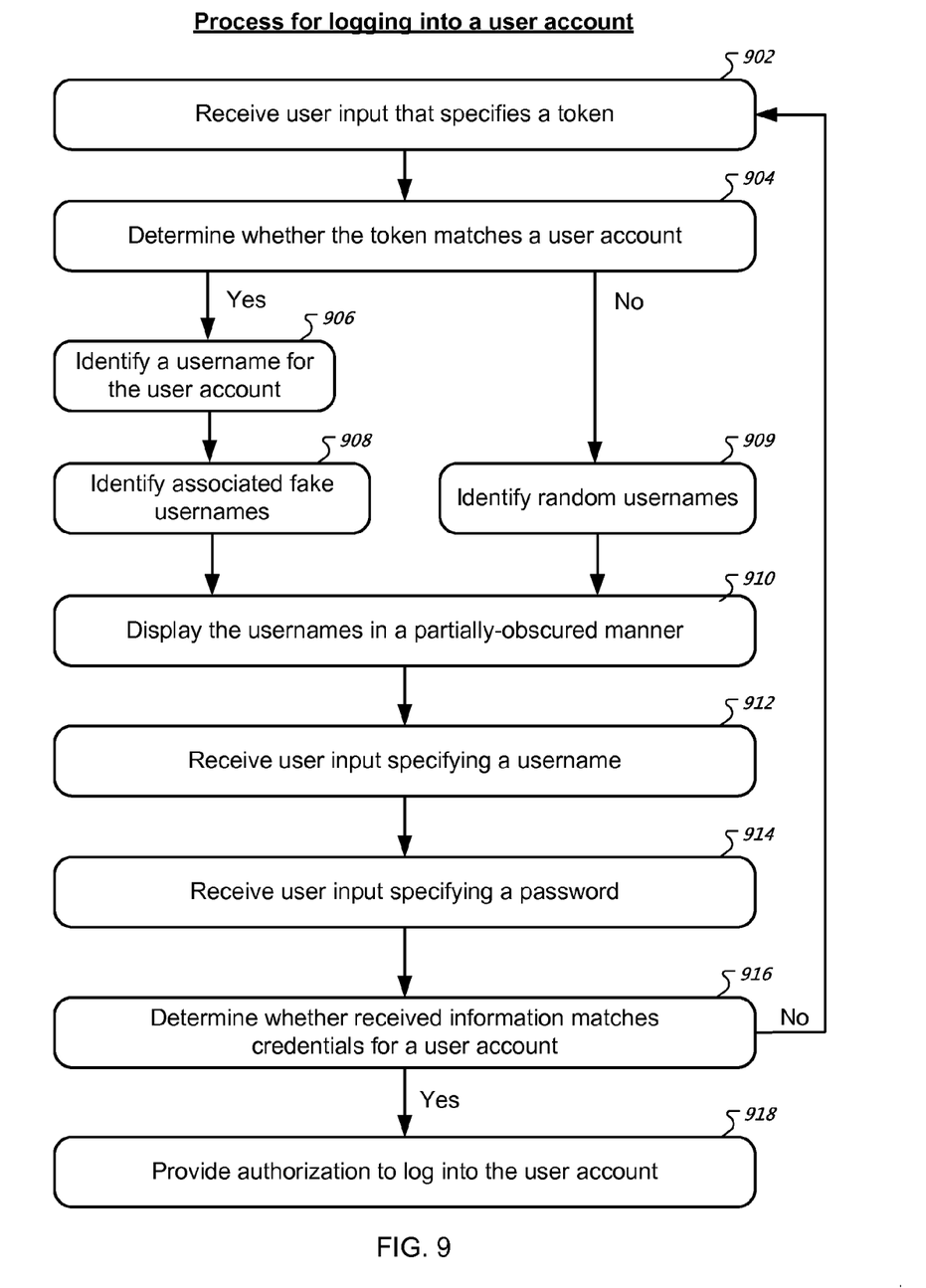
FIG. 9 shows a flowchart of a process for logging into a user account.

FIG. 9 shows a flowchart of a process for logging into a user account.

At box 902, a computing system receives user input that specifies a token. For example, a computing device that displays screen 100 (e.g., a laptop) may receive an indication that a user typed the token "ilikemathematics" into text box 106 and selected the submit button. As a result, the computing device may transmit the token (e.g., in plain text or encrypted format) to a remote computing system, which may receive the token.

At box 904, the computing system may determine whether the token matches a token stored for a user account. For example, the remote computing system may compare the received token to each of multiple tokens that are stored in a database in order to determine whether the received token matches any of the multiple tokens (e.g., one or more of the multiple tokens), where the multiple tokens may be assigned to respective user accounts and each user account may be assigned a single token.

At box 906, as a result of determining that the received token matches a token that is assigned to one or more user accounts, the computing system may identify one or more usernames for the one or more user accounts. For example, the computing system may identify that the username "frank1982" is assigned to a user account to which the token "ilikemathematics" is also assigned.

At box 908, the computing system identifies the associated fake usernames. For example, the fake usernames may be those that are assigned to the user account to which the received token is assigned, and that were displayed to the user after account creation (e.g., as shown in FIG. 4). In some examples, these associated fake usernames are fake usernames that were not displayed to the user previously. In some examples, these fake usernames may include real usernames of other users.

At box 909, in the example in which the computing system determines that the received token does not match a token that is assigned to a user account, the computing system identifies random usernames because there is a benefit to preventing an attacking user from knowing whether the entered token matches any user accounts by showing the attacker a list of partially-obscured usernames regardless whether the token is valid. The random usernames may be generated by the computing system in response to having determined whether the token matches a user account. In some implementations, at least some of the random usernames are real usernames of other users.

At box 910, the computing system displays the usernames in a partially-obscured manner (e.g., by providing information to another computing device to cause such a display).

For example, the computing system may display the identified username with the other usernames (in which the order of usernames is random), with some of the characters of all the usernames masked, as shown in FIG. 6. In those examples in which the computing system determined that the received token does not match a token of an existing user account, the user interface that is shown in FIG. 6 may still display a list of partially-obscured usernames. The computing system may obscure only part of the usernames in various manners, e.g., by masking characters, by blacking out certain characters, and by only displaying some of the characters of a username and not displaying others.

At box 912, the computing system receives user input specifying a username. For example, the computing device that is displaying screen 600 may receive an indication that a user selected radio button 612 (assigned to partially-obscured username "**k1982") and selected the "Submit" user interface element 610. An indication that user input selected partially-obscured username "**k1982" may be sent to a remote server system, which may receive the indication.

At box 914, the computing system receives user input specifying a password. For example, the computing device that is displaying screen 600 may receive an indication that user input typed the password 608 into text box 606 and selected the "Submit" user interface element 610. As a result, the computing device may transmit the entered password 608 to a remote server system, and the remote server system may receive the password 608.

At box 916, the computing system determines whether the received information (e.g., the token, username, and password) matches credentials for a user account. For example, the computing system may have already determined that the user is attempting to access the particular user account to which the token "ilikemathematics" is assigned. As such, the computing system determines whether the user-specified username and password match those on file for the particular user account.

As a result of determining that the credentials do not match those identified as being assigned to the user account (i.e., all of the token, username, and password do not match a token, username, and password for any user account for which the computing system stores information), the computing system may repeat the process by returning to the operations of box 902. In doing so, the computing system may present an indication that the entered information is not sufficient to provide the user with access to a user account, e.g., as shown by screen 700 in FIG. 7. The computing system may not indicate to the user which of the token, username, and password caused the system to determine that the user is unauthenticated.

During a subsequent iteration of the process in FIG. 9, the computing system may identify and display the same other usernames (see boxes 908 and 910) so that an attacking system is not able to identify the one username that does not change. In some examples, at least some of the other usernames change during another display of the other usernames, but the portion of the other usernames and the identified username that is masked may change (e.g., so that the end of the username is masked rather than the beginning, as shown in FIG. 6) so that an attacking system is not able to determine which username remained unchanged.

As a result of determining that the received information matches the credentials for a user account, the computing system performs the operations of box 918, by providing authorization to log into the user account. Providing authorization may involve the computing system providing information for display to the user that the user would not be able to access without providing the correct credentials. In some implementations, providing authorization involves the computing system sending to another computing system an indication that the user is authenticated, and thus that the other computing system can provide the user with access to such information (e.g., the computing system may serve as an authentication system for third-party systems).

In some implementations, the computing system may not display any usernames, and may prompt the user to specify the username with a text box (e.g., so that the user has to type in the token, the username, and the password). In some implementations, the displayed list of usernames are usernames that are not partially obscured (e.g., a user can see all of each username). In some implementations, the token or username is an image. For example, the user may upload or select one of multiple displayed images, and the displayed list of usernames may include displaying multiple images and requesting that the user select one of the displayed images. In some implementations, the token, username, or password is an audio input (e.g., a spoken phrase or humming of a song). In some implementations, the token, username, or password is special keys (e.g., CTRL and ALT) alone or in combination with various other alphanumeric or symbolic keys.

In some implementations, the computing system does not display text that shows the token. For example, after a user types the token into text box 106 (in which the token may be masked during the typing) and selects the link 108 or the submit button 502, one or more of screens 200, 300, 400, and 600 may not display token 202 at all, or may only display a portion of token 202 (e.g., in a partially-obscured manner, such as "****tics"). Moreover, the computing system may store the tokens, usernames, and passwords in separate files in order to mitigate the risk of theft. Moreover, these files may be encrypted and may store the information in hashed format to prevent theft of such information.

These and other services may be implemented in a server system. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

The use of the terms "token" and "username" are not intended to limit the scope of the claims to data that is described as being a token or a username. For example, information entered into a text boxes, regardless of the label of the text boxes, may fall within the scope of the claimed "token" and "username." As such, the described "token" may be referred to as the username, and the display of multiple "usernames" may be referred to as a display of multiple tokens, or even a display of multiple selectable passwords.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 10:
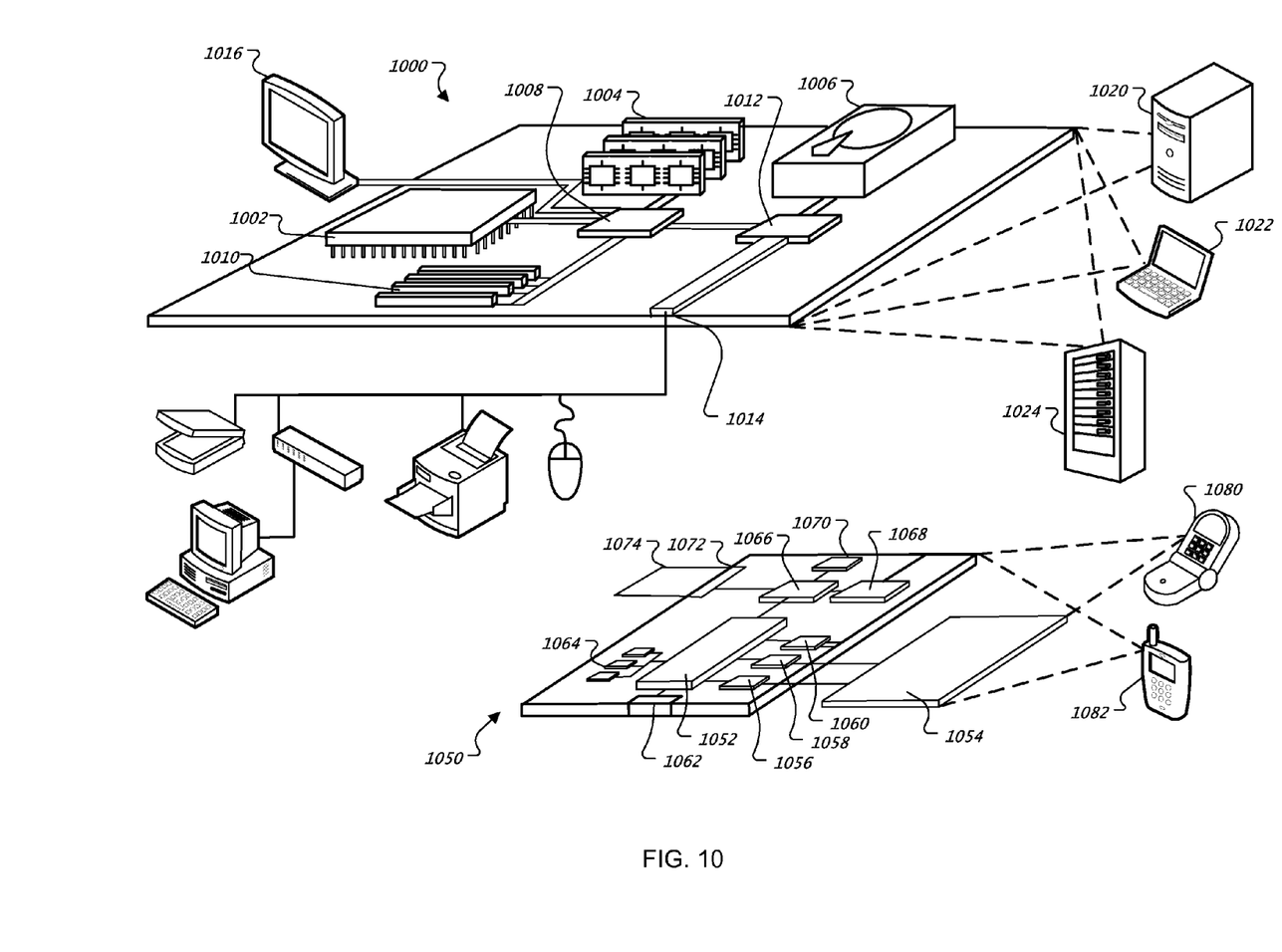
FIG. 10 shows a block diagram of computing devices that may be used to implement the systems and methods described in this document, as either a client or as a server or plurality of servers.

FIG. 10 is a block diagram of computing devices 1000, 1050 that may be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high-speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low speed controller 1012 manages lower bandwidth-intensive operations. Such allocation of functions is by way of example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, some of which are shown in the figure. For example, it may be implemented as a cellular telephone 1080. It may also be implemented as part of a smartphone 1082, personal digital assistant, or other similar mobile device.

Additionally computing device 1000 or 1050 can include Universal Serial Bus (USB) flash drives. The USB flash drives may store operating systems and other applications.

The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
receiving, by a computing system, a token that was specified by first user input during a process for logging into a user account;
determining, by the computing system, whether the token that was specified by the first user input matches any of a plurality of tokens that are assigned to a respective plurality of user accounts;
identifying, by the computing system and in response to determining that the token that was specified by the first user input matches a particular token that is assigned to a particular one of the plurality of user accounts, a username for the particular one of the plurality of user accounts;
providing, by the computing system, information to cause a computer display to present, for user selection:
(i) the username with a part of the username obscured, and
(ii) multiple other usernames with a part of each of the multiple other usernames obscured, at least one of the multiple other usernames including a fake username to obscure a connection between the token and the username;
receiving, by the computing system, an indication that second user input selected, during the process for logging into the user account, the username with the part of the username obscured;
receiving, by the computing system, a particular password that was specified by third user input during the process for logging into the user account; and
providing, by the computing system, authorization to log into the user account in response to the computing system having:
(i) received the indication that the second user input selected the username with the part of the username obscured in distinction to any of the multiple other usernames with the part of each of the multiple other usernames obscured,
(ii) determined that the username that was selected by the second user input matches the username that is assigned to the particular one of the plurality of user accounts associated with the token that was specified by first user input, and
(iii) determined that the particular password that was specified by the third user input matches a password that is assigned to the particular one of the plurality of user accounts associated with the token that was specified by the first user input.

2. The computer-implemented method of claim 1, wherein the token, the username, and the password were specified by user input during a process for specifying credentials for the user account.

3. The computer-implemented method of claim 1, further comprising receiving, by the computing system and during a process for specifying credentials for the user account that precedes performance of the process for logging into the user account, user input that specifies the token, user input that specifies the username, and user input that specifies the password.

4. The computer-implemented method of claim 1, wherein presenting the username with the part of the username obscured includes presenting the username with some of the characters in the username replaced with a masking character.

5. The computer-implemented method of claim 1, wherein presenting the username with the part of the username obscured includes presenting the username with some of the characters in the username removed.

6. The computer-implemented method of claim 1, wherein the token, username, and password were each user input during the process for logging into the user account by user typing.

7. The computer-implemented method of claim 1, wherein the computing system is configured so that, upon determining that a selected username or a specified password does not match credential information stored for the particular one of the plurality of user accounts, the computing system does not indicate which of the selected username and the specified password failed to match the credential information stored for the particular one of the plurality of user accounts.

8. A system comprising:
one or more processors; and
one or more non-transitory computer-readable medium including instructions that, when executed by the one or more processors, cause performance of operations that comprise:
receiving, by a computing system, a token that was specified by first user input during a process for logging into a user account;
determining, by the computing system, whether the token that was specified by the first user input matches any of a plurality of tokens that are assigned to a respective plurality of user accounts;
identifying, by the computing system and in response to determining that the token that was specified by the first user input matches a particular token that is assigned to a particular one of the plurality of user accounts, a username for the particular one of the plurality of user accounts;
providing, by the computing system, information to cause a computer display to present, for user selection:
  (i) the username with a part of the username obscured, and
  (ii) multiple other usernames with a part of each of the multiple other usernames obscured, at least one of the multiple other usernames including a fake username to obscure a connection between the token and the username;
receiving, by the computing system, an indication that second user input selected, during the process for logging into the user account, the username with the part of the username obscured;
receiving, by the computing system, a particular password that was specified by third user input during the process for logging into the user account; and
providing, by the computing system, authorization to log into the user account in response to the computing system having:
  (i) received the indication that the second user input selected the username with the part of the username obscured in distinction to any of the multiple other usernames with the part of each of the multiple other usernames obscured,
  (ii) determined that the username that was selected by the second user input matches the username that is assigned to the particular one of the plurality of user accounts associated with the token that was specified by first user input, and
  (iii) determined that the particular password that was specified by the third user input matches a password that is assigned to the particular one of the plurality of user accounts associated with the token that was specified by first user input.

9. The system of claim 8, wherein the token, the username, and the password were specified by user input during a process for specifying credentials for the user account.

10. The system of claim 8, wherein the operations further comprise receiving, by the computing system and during a process for specifying credentials for the user account that precedes performance of the process for logging into the user account, user input that specifies the token, user input that specifies the username, and user input that specifies the password.

11. The system of claim 8, wherein presenting the username with the part of the username obscured includes presenting the username with some of the characters in the username replaced with a masking character.

12. The system of claim 8, wherein presenting the username with the part of the username obscured includes presenting the username with some of the characters in the username removed.

13. The system of claim 8, wherein the token, username, and password were each user input during the process for logging into the user account by user typing.

14. The system of claim 8, wherein the computing system is configured so that, upon determining that a selected username or a specified password does not match credential information stored for the particular one of the plurality of user accounts, the computing system does not indicate which of the selected username and the specified password failed to match the credential information stored for the particular one of the plurality of user accounts.

* * * * *